United States Patent
Shah

(10) Patent No.: US 10,280,333 B2
(45) Date of Patent: May 7, 2019

(54) COATING COMPOSITIONS

(71) Applicant: Seagrave Coatings Corp., Kenilworth, NJ (US)

(72) Inventor: Rohit Shah, Edison, NJ (US)

(73) Assignee: Seagrave Coatings Corp., Kenilworth, NJ (US)

( * ) Notice: Subject to any disclaimer, the term of this patent is extended or adjusted under 35 U.S.C. 154(b) by 0 days.

(21) Appl. No.: 15/011,702

(22) Filed: Feb. 1, 2016

(65) Prior Publication Data
US 2016/0237309 A1    Aug. 18, 2016

Related U.S. Application Data

(60) Provisional application No. 62/111,462, filed on Feb. 3, 2015.

(51) Int. Cl.
| | |
|---|---|
| C08K 5/29 | (2006.01) |
| C09D 5/00 | (2006.01) |
| C08G 18/10 | (2006.01) |
| C08G 18/38 | (2006.01) |
| C08G 18/79 | (2006.01) |
| C08L 75/04 | (2006.01) |
| C09D 175/04 | (2006.01) |
| C09D 175/06 | (2006.01) |
| B43L 1/00 | (2006.01) |
| B43L 1/10 | (2006.01) |

(52) U.S. Cl.
CPC ............ *C09D 175/06* (2013.01); *B43L 1/002* (2013.01); *B43L 1/10* (2013.01); *C08G 18/10* (2013.01); *C08G 18/3821* (2013.01); *C08G 18/792* (2013.01); *C08K 5/29* (2013.01); *C09D 5/00* (2013.01); *C09D 175/04* (2013.01)

(58) Field of Classification Search
CPC ... C08K 5/29; C08L 75/04; B43L 1/10; B43L 1/002; C08G 73/00; C08G 18/09; C08G 18/10; C08G 18/782; C08G 18/089; C08G 18/72; C08G 18/792; C08G 18/3821; C08G 3/00; C09D 175/04; C09D 175/06; C09D 5/00
See application file for complete search history.

(56) References Cited

U.S. PATENT DOCUMENTS

| | | | | |
|---|---|---|---|---|
| 4,694,051 A | * | 9/1987 | Kordomenos | C08G 18/10 525/437 |
| 5,432,211 A | * | 7/1995 | Morita | C09D 5/00 523/415 |
| 5,466,769 A | * | 11/1995 | Chou | C08G 18/3296 525/510 |
| 5,516,873 A | | 5/1996 | Hicks et al. | |
| 5,798,409 A | * | 8/1998 | Ho | C08G 18/10 524/506 |
| 6,828,405 B1 | | 12/2004 | Cai | |
| 8,309,653 B2 | | 11/2012 | Goscha et al. | |
| 8,618,213 B2 | * | 12/2013 | Flosbach | C08G 18/1825 427/385.5 |
| 8,686,091 B2 | | 4/2014 | Goscha et al. | |
| 9,631,281 B2 | * | 4/2017 | Wissing | C23C 22/73 |
| 2005/0153139 A1 | * | 7/2005 | Levitt | C08G 18/222 428/423.1 |
| 2005/0271881 A1 | | 12/2005 | Hong | |
| 2006/0252856 A1 | * | 11/2006 | Anderson | C08G 18/089 524/92 |
| 2006/0281862 A1 | * | 12/2006 | Schellekens | C08F 8/30 525/124 |
| 2013/0004777 A1 | | 1/2013 | Sheth et al. | |
| 2015/0175860 A1 | * | 6/2015 | Golombowski | C08G 18/632 156/331.7 |
| 2015/0184021 A1 | | 7/2015 | Nachtman et al. | |

FOREIGN PATENT DOCUMENTS

| | | | | |
|---|---|---|---|---|
| EP | 0531249 A1 | * | 9/1993 | ......... C08G 18/2865 |
| EP | 2208766 A2 | | 7/2010 | |
| WO | 2013141958 A1 | | 9/2013 | |

OTHER PUBLICATIONS

Extended European Search Report, dated Aug. 1, 2016.
Mike Jeffries, Polyaspartic coatings, p. 1-15, Paint Square, Dec. 2013.

* cited by examiner

*Primary Examiner* — Satya B Sastri
(74) *Attorney, Agent, or Firm* — Charney IP Law LLC; Thomas M. Finetti

(57) ABSTRACT

The present disclosure provides coating compositions free of acrylates and epoxies for use in dry-erase surface preparations and protective floor coverings.

16 Claims, No Drawings

COATING COMPOSITIONS

CROSS-REFERENCE TO RELATED APPLICATIONS

The present disclosure claims prior to U.S. Provisional Patent Application No. 62/111,462 filed on Feb. 3, 2015, the disclosure of which is hereby incorporated by reference herein in its entirety.

BACKGROUND

Dry erase products allow users to write on a surface and then easily remove the writing, through multiple cycles. Such products have proven highly popular with and are attractive to consumers, but many demonstrate inferior properties.

A typical dry-erase writing surface ("white board") includes a white board or substrate that is coated with a relatively non-porous surface such as an enamel, film, coating, or porcelain finish. White boards are typically provided in classrooms and conference rooms as chalk board substitutes and in homes as discrete note pad sized boards that facilitate messaging, reminders, lists, and the like. Specially designed markers ("dry-erase" markers) are employed to write on the white boards. While the ink of the marker dries on the substrate, the ink does not bond to the substrate surface and the writing can be easily removed with a soft eraser, cloth, finger, and the like.

U.S. Pat. No. 8,309,653 ("the '653 Patent) discloses a composition that when applied to a substrate as a coating, provides for a surface having writeable-erasable characteristics. The compositions disclosed in the '653 Patent are acrylic based or epoxy based resins with a crosslinking converter resin.

United States Patent Application No. 2015/0184021 also discloses compositions that may be suitable for use as coatings and that may provide for a surface having writeable-erasable characteristics. The compositions disclosed in this patent application all include silanes.

BRIEF SUMMARY OF THE DISCLOSURE

In one aspect of the present disclosure is a kit comprising a first part comprising a resin and a pot life extender; and a second part comprising a cross-linker; wherein the first part and second part are present in a ratio of about 1 to about 1 by volume, wherein the kit is free of acrylates or epoxy-based components. In some embodiments, the cross-linker is an isocyanate cross-linker. In some embodiments, the isocyanate cross-linker is aliphatic. In some embodiments, the resin is an aliphatic polyurethane. In some embodiments, the aliphatic polyurethane is a polyaspartic polyurethane. In some embodiments, the polyaspartic polyurethane is derived from a reaction product of an aliphatic polyisocyanate component and a polyaspartic ester component. In some embodiments, the kit is free from silane-based components.

In another aspect of the present disclosure is a composition comprising (a) a non-acrylic resin selected from the group consisting of an aliphatic polyurethane resin or a polyaspartic resin; (b) a pot-life extending agent; and (c) a isocyanate-based cross-linking agent; wherein the composition has a pot-life of at least about 45 minutes; and wherein the composition, once cured, has a barcol hardness of about 50. In some embodiments, the composition further comprises a pigment or a colorant. In some embodiments, the composition further comprises titanium dioxide. In some embodiments, the coating further comprises a water scavenger or deaerator agent. In some embodiments, the composition further comprises nanoparticle size aluminum oxide.

In another aspect of the present disclosure is a dry erase article comprising a curable hardcoat layer ("coating") secured to a substrate, the curable hardcoat layer comprising a composition having (a) a non-acrylic resin selected from the group consisting of an aliphatic polyurethane resin or a polyaspartic resin; (b) a pot-life extending agent (e.g. an aldimine); and (c) a isocyanate-based cross-linking agent; wherein the dry erase article comprises a writing surface disposed on the curable hardcoat layer suitable for receiving dry erase marker ink or other marking materials. In some embodiments, the composition further comprises at least one of a pigment or a colorant. In some embodiments, the composition further comprises titanium dioxide.

Generally, the coatings having the dry-erase writing surface or writable-erasable surface are produced from one or more acrylate-free or epoxy-free precursor materials; and the coatings cure under ambient conditions, as described further herein. In some embodiments, the coatings for the dry-erase surface are substantially white or clear and free from "tiger stripping" or yellow-banding, as disclosed further herein. In some embodiments, when the writing surface is marked with a marking material, such as a water- or alcohol-based marking material, the marking material can be erased to be substantially invisible with little or no ghosting, even after prolonged and repeated use.

In some embodiments, the one or more materials that form the coatings emit minimal volatile organic compounds (VOCs) during their application to a substrate or during their curing on the substrate. In some embodiments, the resulting coatings have many desirable attributes, including one or more of the following: low porosity, low surface roughness, and high elongation at break. Generally, while not intending to be bound by any theory, it is believed that the low porosity of the coatings makes the coatings substantially impervious to the marking materials, while the low surface roughness prevents the marking materials from becoming entrapped on the surface beyond effective reach of an eraser. These attributes collectively allow for marking material or inks to be removed with little or no ghosting.

In some embodiments, the kit, compositions, coatings, and cured coatings described herein may be used for refinishing countertops (of any material), flooring (for refinishing a floor of any material or as a protective coating for the floor), wood, metal, or any surface that requires a high gloss and/or high durability. Other suitable substrates include furniture, musical instruments (e.g. pianos, guitars) and other objects that require a depth of gloss due to high build of coating.

In another aspect of the present disclosure is a kit comprising a first part comprising a resin having a pot life of at least 30 minutes; and a second part comprising a cross-linker; wherein the first part and second part are present in a ratio of about 1 to about 1 by volume, wherein the kit is free of acrylates or epoxy-based components. In some embodiments, the resin has a pot life of at least 45 minutes.

DETAILED DESCRIPTION

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

Coating Formulations

In general, the present disclosure provides curable or hardenable coating compositions and/or protective coating systems that are free of acrylates or other acrylic-based components or epoxy based. In some embodiments, the coating compositions of the present disclosure comprise a two-part system. The first part comprises two components, namely a resin and an pot life extender. The second part comprises a cross-linker. Each of these parts and components will be described in more detail herein.

Resins

In some embodiments, the resin is a non-acrylic resin, i.e. the resin is one which does not contain any acrylates or any acrylate-based components. In some embodiments, the resin is an aliphatic polyurethane, including branched, unbranched, saturated, and unsaturated aliphatic polyurethanes.

In yet other embodiments, the resin is a polyaspartic resin. In some embodiments, the polyaspartic resin is derived from a reaction product of an aliphatic polyisocyanate component and a polyaspartic ester component. In some embodiments, the resin is Arnette ALI 0S, available from Arnette Polymers®, LLC (South Plainfield, N.J.). In other embodiments, the resin is Teraspartic® 277, available from Pflaumer Brothers (Ewing, N.J.). In yet other embodiments, the resin is Desmophen® NH 1420, available from from Covestro (formerly Bayer Material Science).

In some embodiments, the aliphatic polyurethane resins can be in the form of dispersions of urethane prepolymers and oligomers in a carrier, such as a water-based carrier or solvent-based carrier. In some embodiments, the polyurethane dispersions can be generated in-situ.

In some embodiments, the non-acrylic resin selected has a viscosity ranging from between 300 to about 450 cps at 25 degrees C. In some embodiments, the non-acrylic has a viscosity ranging from between about 380 cps to 450 cps at 25 degrees C.

Aliphatic polyurethane resins may be derived according to any means known to those of ordinary skill the art. For example, aliphatic polyurethanes can be obtained by the reaction of a suitable diisocyanate or polyisocyanate with a suitable diol, or a polyol. Polyurethanes exhibit a wide range of hardness and flexibility depending on various components including the nature of the isocyanate and/or the polyol in addition to the nature of curing. Polyurethane coatings could either be formulated as one component or two component coatings. Reactive polyurethane coatings involve the isocyanate as the reactive group during curing, as disclosed in "The ICI Polyurethanes Book, George Woods. (John Wiley & Sons: New York, 1987)," and "Organic Coatings-Properties, Selection and Use U.S. Department of Commerce, National Bureau of Standards: Washington D.C., Series 7; February 1968, " the disclosures of which are incorporated by reference herein.

The isocyanate may comprise an organic polyisocyanate in which part of the isocyanate groups have been modified by reaction with one or more isocyanate-reactive compounds. Suitable polyisocyanates can include aliphatic and cycloaliphatic polyisocyanates. Such isocyanates include those having the formula $Q(NCO)_n$ in which n is a number from 2 to about 5 (for example 2 to 3) and Q is an aliphatic hydrocarbon group containing 2 to about 18 (for example 6 to 10) carbon atoms, or a cycloaliphatic hydrocarbon group containing 4 to about 15 (for example 6 to 15) carbon atoms. Further examples of suitable polyisocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3-and-1,4-diisocyanate, and mixtures of these isomers; 1-isocyanato-3,3,5-trimethyl-5-isocyanatomethylcyclohexane (see, e. g. German Auslegeschrift 1,202,785 and U.S. Pat. No. 3,401,190), bis (4-isocyanatocyclohexyl methane (Desmodur W), a,a,a', a'-tetramethylxylylene diisocyanate.

Suitable modified polyisocyanates can be prepared by the reaction of organic polyisocyanates such as described above with one or more compounds containing isocyanate-reactive groups, such as hydroxyl, amino, urethane ureas, carboxyl, biurets, allophanates, thiol groups (for example hydroxyl and/or amino groups) and various blocking groups known in the art and having a functionality about 2 to about 6, such that up to about 10 (for example less than 5) equivalent percent of the isocyanate groups have been modified. In one embodiment, the modified polyisocyanate can have one or more carbon moieties (—CH2—, =CH, etc) replaced with a heteroatom (such as N, S, O) as long as the isocyanate and resultant urethane, have a stability comparable to a one not having the substitution.

Other examples of organic diisocyanates include aliphatic, cycloaliphatic (alicyclic), and aromatic diisocyanates. e.g., methylene diisocyanate, tetramethylene diisocyanate, hexamethylene diisocyanate, octamethylene diisocyanate, decamethylene dii socyanate, 2-methylpentane-1,5-diisocyanate, toluene diisocyanate, diphenylmethane diisocyanate, m- and p-phenylene diisocyanates, 4-chloro-m-phenylene diisocyanate, bitolylene diisocyanate, cyclohexane diisocyanate, bis-(isocyanatomethyl)cyclohexane, dicyclohexylmethane diisocyanate, dimer acid diisocyanate, trimethyl hexamethylene diisocyanate, lysine diisocyanate and its methyl ester, methyl cyclohexane diisocyanate, 1,5-napthalene diisocyanate, xylene diisocyanate, polyphenylene diisocyanates, isophorone diisocyanate, hydrogenated methylene diphenyl isocyanate, tetramethyl xylene diisocyanate, 4-t-butyl-m-phenylenediisocyanate, 4,4'-methylene bis(phenyl isocyanate), tolylene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, or oligomers and homopolymers thereof, and mixtures thereof. In some embodiments, the aliphatic diisocyanate, their oligomeric prepolymers, or aliphatic polyisocyanate can be hydrophilic.

The isocyanate containing material of the formulation can have a viscosity of about 91 Kreb Units (Ku), e.g., about 85 Ku, about 90 Ku, about 95 Ku, about 100 Ku, or about 105 Ku. In some embodiments, the isocyanate containing material of the formulation can have a viscosity of from about 40

Ku to about 105 Ku, e.g., from about 60 Ku to about 105 Ku, from about 70 Ku to about 105 Ku, or from about 80 Ku to about 95 Ku.

Suitable polyether polyols include polyethers prepared, for example, by the polymerization of epoxides such as ethylene oxide, propylene oxide, butylene oxide, or epichlorohydrin, optionally in the presence of Lewis acids such as BF3, or prepared by chemical addition of such epoxides, optionally added as mixtures or in sequence, to starting components containing reactive hydrogen atoms, such as water, alcohols, or amines. Examples of starting components include ethylene glycol, 1,3- or 1,2-propanediol, 1,2-, 1,3-, or 1,4-butanediol, trimethylolpropane, pentaerythritol or dipentaerythritol, diethyentriamine, and the like.

A polyoxyalkylene diol is an example of another polyol that can be used to produce the coatings. In some embodiments, the polyoxyalkylene diols have a number average molecular weight of from about 200 to 3,000, e.g., from about 500 to about 2,000, as determined using narrow disperse polyethylene glycol standards. Specific examples of polyoxyalkylene diols include polyethyleneether glycol, polypropyleneether glycol, polybutyleneether glycol, polytetramethyleneether glycol, and copolymers of polypropyleneether and polyethyleneether glycols. Mixtures of any of the polyoxyalkylene diols can also be used.

Polyester polyols or polyester diols are polyesters having terminal hydroxyl groups and are examples of polyols that can be used to produce the coatings. Such polyester diols can be prepared by the condensation of a diol, such as ethylene glycol, propanediol-1,2,propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, or mixtures of these diols, with a dicarboxylic acid or an equivalent thereof, e.g., acid halide or anhydride. Examples of acids include oxalic, malonic, succinic, glutaric, adipic, pimelic, suberic, azelaic, terephthalic, sebacic, malic, phthalic, cylohexanedicarboxylic or mixtures of these acids. When preparing these polyester diols, generally an excess of the diol over dicarboxylic acid is used.

Polyamide diols or polyamide polyols having terminal hydroxyl groups are yet another example of a polyol that can be used to produce the coatings. Polyamine polyols having terminal hydroxyl groups are yet another example of a polyol that can be used to produce the coatings. Polyepoxy polyol having terminal hydroxyl groups are yet another example of a polyol that can be used to produce the coatings. Polyvinyl polyol having terminal hydroxyl groups are yet another example of a polyol that can be used to produce the coatings.

The diol can be reacted with the diisocyanate utilizing a molar ratio of about 1:2, respectively, in the presence of an activator (or accelerator) such as oxazolidine or an organotin compound, e.g., dibutyltin dilaurate or dibutyltin dioctoate. The reaction can be allowed to proceed at a temperature of from about 60° C. to about 180° C., from about 4 hours to about 24 hours to provide the isocyanate terminated prepolymer. The isocyanate terminated urethane prepolymer can then be reacted, e.g., at from about 60° C. to about 110° C. for 1 to about 10 hours, with a monomeric, polyhydric alcohol containing 2-6 hydroxyl groups in a molar ratio of 1:2, respectively. Examples of alcohols that can be used include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, and trimethylhexanediol. The result of treating the isocyanate terminated urethane prepolymer with the one or more alcohols is a polyurethane diol having 2-10 terminal hydroxyl groups and no isocyanates groups.

In some embodiments, the resin comprises between about 30% to about 80% of the first part of the coating composition. In other embodiments, the resin comprises between about 20% to about 50% of the first part of the coating composition. In yet other embodiments, the resin comprises between about 27% to about 65% of the first part of the coating composition. In yet further embodiments, the resin comprises between about 27% to about 45% of the first part of the coating composition.

Pot Life Extenders

The compositions of the present disclosure also comprise a pot life extender. In general, pot life is the amount of time after mixing a system during which it can be applied. In resin systems, pot life is the length of time that a catalyzed resin system retains a viscosity low enough to be used in processing. In some embodiments, the viscosity of the pot life extender ranges from about 10 to about 50 cps at 25 degrees C.

In some embodiments, the pot life extender is an aldimine. Aldimine compounds of this disclosure may have a functionality ≥1 and a molecular weight of 200 to 15,000 g/mol. The aldimines of this disclosure are the reaction products obtained from the condensation reaction of an amine or polyamine having one or more primary amino groups with an organic aldehyde, optionally in the presence of a solvent. In some embodiments, the polyamines having 2 to 3 primary amino groups which are bound to aromatic or preferably aliphatic or cycloaliphatic residues, and having a molecular weight of 31 to 5000 g/mol. Primary amine compounds useful in this disclosure include those represented by the formula R—(NH2)x where R is a hydrocarbon group, which may also contain oxygen, nitrogen, sulfur or halogen, wherein x is ≥1. Suitable amines include, but are not limited to, propylamine, isopropylamine, butylamine, cyclohexylamine, ethylene diamine, propylene diamine, tetramethylene diamine, pentamethylene diamine, hexamethylene diamine, isophorone diamine, dicyclohexylmethane diamine, cyclohexane diamine, 1,3-cyclohexane bis (methylamine), 2-methylpentamethylene diamine, 1,1 2-dodecane diamine, bis-hexamethylene diamine, dimethylethylene diamine, diethylethylene diamine, dimethyl propylene diamine, diethyl propylene diamine, pentaethylene hexamine, diethylene triamine, xylylene diamine, m-phenylene diamine, p-phenylene diamine, 4,4'-methylene dianiline, 4,4'-diaminodiphenyl sulfone, 2,6-diaminopyridine, 4,4'-methylene bis(3-chloroaniline), 4,4'-methylene bis(3-chloro-2,6-diethylaniline), 4,4'-methylene bis(3-chloro-2,5-diethylaniline), 3,3'-diisopropyl-4,4'-diaminodiphenylmethane, 3,5,3',5'-tetraethyl-4,4'-diaminodiphenylmethane, 1-methyl-3,5-diethyl-2,4-diaminobenzene, 1-methyl-3,5-diethyl-2,6-diaminobenzene (also known as A or diethyl toluene diamine), di(methylthio) toluene diamine, 1,3,5-triethyl-2,6-diaminobenzene, toluene diamine derivatives containing halogen groups, cyano groups, alkoxy, alkylthio, alkenyl or carbonylic moieties, primary and secondary amine terminated polyethers of 100-10,000 molecular weight having 2-6 functionality, preferably from 2 to 3, and mixtures thereof. Commercial products include the Jeffamine compounds from Huntsman Corporation, Conroe, Tex., and Polamine 650 and Polamine 1000 from Polaroid Corporation, Assonet, Mass.

In some embodiments, the aldimine is Arnox 6, available from Arnette Polymers, LLC. In other embodiments, pot life extender is Vestamine® A-139 (isophorondiamine) available from Evonik Industries.

In some embodiments, the pot life extender comprises between about 5% to about 60% of the first part of the coating composition. In other embodiments, the pot life extender comprises between about 5% to about 40% of the first part of the coating composition. In yet other embodiments, the pot life extender comprises between about 5% to about 30% of the first part of the coating composition. In further embodiments, the pot life extender comprises between about 5% to about 25% of the first part of the coating composition. In some embodiments, an amount of pot life extender is added to the first part of the two-part system to provide a pot life of between about 30 minutes and about 90 minutes. In other embodiments, an amount of pot life extender is added to the first part of the two-part system to provide a pot life of at least 45 minutes.

Cross-linkers

The second part of the two-part compositions of the present disclosure comprises a cross-linker. The cross-linker comprises two or more functional groups capable of undergoing chemical reaction with the resins disclosed herein. In some embodiments, the cross-linker is an isocyante. In other embodiments, the cross-linker is a primary isocyanate, such as one having a carbon atom that has an —NCO group and two hydrogen atoms attached to the carbon atom.

Isocyanate crosslinking agents of utility in the coatings of the present disclosure are commonly known in the art and include, but are not limited, to isocyanate functional adducts, biurets, isocyanurates or allophanates of toluene diisocyanate, hexamethylene diisocyanate, isophorone diisocyanate and meta-tetramethyl xylene diisocyanate. The preferred index between the isocyanate groups and the total of all reactive groups contained in the coating with which isocyanates may react, is 0.5 to 2.5 on a molar basis. The isocyanates listed with regard to the formation of polyurethanes may, in some embodiments, be used as cross-linkers.

In some embodiments, the cross-linker is selected from a blocked isocyanate having two or more isocyanate functional groups, or an isocyanate group and a vinyl group, capable of cross-linking with at least one functional group of the resin. In other embodiments, the blocked isocyanate is an aliphatic and/or cycloaliphatic blocked polyisocyanate, for example HDI (hexamethylene diisocyanate), IPDI (isophorone diisocyanate), TMXDI (bis[4-isocyanatocyclohexyl]methane), H12MDI (tetramethylene-m-xylidene diisocyanate), TMI (isopropenyldimethyl-benzylisocyanate) and dimers or trimers thereof. Preferred blocking agents include, for example, n-butanone oxime, c-caprolactam, diethyl malonate, and secondary amines.

Suitable blocked isocyanate cross-linkers are commercially available. Examples of suitable commercially available blocked isocyanate cross-linkers include VESTANAT™ B 1358 A, VESTANAT™ EP B 1186 A, VESTANA™ EP B 1299 SV (all available from Degussa Corp., Marl, Germany); and DESMODUR™ VPLS 2078 and DESMODUR™ BL 3175 (available from Bayer A.G., Leverkusen, Germany). In some embodiments, the cross-linker is selected from one of Tolonate HDT or HDT-LV (a hexane—1,6 diisocyanate-homopolymer), available from Vencorex. In other embodiments, the cross-linker is Teracure® NX 16, available from Plaumer Brothers. In yet other embodiments, the cross-linker is Desmodur® N 3900 (an aliphatic polyisocyanate based hexamethylene diisocyanate), available from Bayer Corporation.

In some embodiments, the cross-linker comprises between about 30% to about 70% of the total volume of the coating composition. In yet other embodiments, the cross-linker comprises between about 35% to about 65% of the total volume of the coating composition.

Solvents

The coating compositions and formulations described herein may contain one or more solvents, for example, water and water-miscible, low-boiling solvents, for example inert organic solvents including ketones such as methyl ethyl ketone, hydrocarbon solvents, aromatic solvents such as toluene, ethyl acetate, n-methyl pyrrolidone, and the like. Aqueous dispersions which are prepared using such inert organic solvents will contain volatile organic compounds unless such solvents are stripped from the dispersions prior to use. Alternatively, the two-part system of the present disclosure may be 100% solids (i.e., free from water and other solvents, or substantially free from solvents (e.g. less than 20% content of volatile solvents)). In some embodiments, either one or both of the first and second parts is solvent free, i.e. containing less than about 1% solvent. In some embodiments, the second component has a low viscosity, ranging from about 800 mPa.s to about 1500 mPa.s at about 25C.

The coating can be formed from a material in a water-based carrier. While not intending to be bound by theory, it is believed that solvents can be effective as a dispersive vehicle for the pigments and resins in a coating formulation prior to curing. During the application of the formulation, they aid in achieving an appropriate viscosity of the formulation. However, after the coating has been cured, it can be expected that there is no residual solvent. The solvents can include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one.

In some embodiments, the solvent is Solvesso® 150, available from ExxonMobil. In other embodiments, the solvent is 1-(2-Methoxy-Methyl-Ethoxy)-2-Propanol Acetate (also referred to as dimethylolpropionic acid, DPMA, DPM acetate).

The materials that form the coating may be selected such that there are little or no VOCs emitted, e.g., solvents and/or formaldehyde, during application to the substrate (e.g. Oxsol 100, available from IsleChem, Grand Island, N.Y. may be selected as a carrier for spray application such that little or no VOCs will be emitted, as disclosed herein). The cured coatings can be generally stable and can also emit relatively little or no VOCs. The decreased amount of volatile content (usually solvents) and ambient cure can reduce environmental impact and can make the materials less toxic (decreased inhalation and absorption) and safer (decreased flammability and flash point) to use. The reduced emission of organic solvents during the application of the solvent-based coating ensures that the application area need not be isolated from other areas, need not be well ventilated, and that little or no personal protection equipment is required. The use of ambient cure material allows for energy efficiency during the curing process as compared to curing processes that require energy in the form of radiation. The reduced amounts of organic solvents can also lead to increased pot life of the coating material and hence decreased material waste. Low VOC emissions and ambient cure can also provide coatings and/or writable-erasable surfaces that have one or more of the desirable attributes, such as low porosity, low surface roughness, and high elongation at break.

In some embodiments, the material has less than about 350 g/L of VOCs, e.g., about 300 g/L, about 250 g/L, about 200 g/L, about 150 g/L, about 100 g/L, about 50 g/L, or even less than about 0.5 g/L of VOCs. In other embodiments, the material has between about 0 and about 50 g/L of VOCs, e.g., between about 1 g/L and about 10 g/L, between about 10 g/L and about 20 g/L, between about 20 g/L and about 30 g/L, between about 30 g/L and about 40 g/L, or between about 40 g/L and about 50 g/L of VOCs. The material may also be substantially free of VOCs. Advantageously, when a VOC is utilized, it can be a VOC that is exempted from United States Environmental Protection Agency (EPA) guidelines, e.g., methyl acetate, t-butyl acetate, or acetone.

Additional Components

Other compounds, such as coloring agents and decorative solids, can be added to the first part and/or second part to enhance to the aesthetics of the finished coating. Coloring agents, such as pigments or dyes, are included at various levels to obtain a desired effect. Decorative solids could include such items as metal flakes, polymeric flakes, glitter, beads, or other materials that provide a decorative feature to the finished polyurethane. The decorative solids are also included in various amounts to obtain a desired effect to the finished article. While white is typically the color of choice for dry erase displays, the compositions of the present disclosure are also amenable to receiving tints and pigments so that the final dry erase surface may have an unlimited color selection suitable for the desired display application. For example, a display conveying warnings may be colored red and a display conveying safety information may be colored green. In an educational or corporate environment, team or institutional colors may be popular choices.

If it is desired that the polyurethane resin of the disclosure have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not prevent the desired urethane reaction. Also finding utility in these coatings are various types pigments common to the art which include but are not limited to titanium dioxide, graphite, carbon black, zinc oxide, chromium oxide, zinc chromate, strontium chromate, barium chromate, chromium oxide, zinc sulfide, yellow nickel titanium, yellow chromium titanium, red iron oxide, transparent red iron oxide, yellow iron oxides, transparent yellow oxide, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, extender pigments such as magnesium silicate, aluminum silicate, calcium silicate, calcium carbonate, fumed silica, barium sulfate. Titanium dioxide pigments such as TiONA® 595 are available from Cristal. Other titanium dioxide pigments are available from Huntsman and DuPont.

Without wishing to be bound by any particular theory, it is believed that pigments, such as titanium dioxide, silicas, calcium carbonates, etc., have an effect on inhibiting or preventing migration of free amines within the reaction components from the film to the top surface of the cured coating. Moreover, again without wishing to be bound by any particular theory, it is believed that such action prevents and/or mitigates a yellowing or "tiger striping" (i.e. uneven, yellowish bands) within the final coating. Indeed, when a composition according to the present disclosure was made without the inclusion of a pigment and with the use of the pot life extender (e.g. a clear coating composition), yellowing and/or "tiger stripping" was observed.

In some embodiments, the compositions further comprise a deaerator. An example of a deaerator is Tallicin® 4040, available from Plaumer Brothers. Another example of a deaerator is BYK A 530, available from BYK-Gardener GmbH. Without wishing to be bound by any particular theory it is believed that outgassing of $CO_2$ may be minimized when a deaerator is utilized, which would otherwise allow for the development of cratering or pinholes in the surface since $CO_2$ gas would otherwise be trapped in the film (if it cures too quickly). It is believed that by minimizing out gassing, a smoother surface may be maintained. Applicants believe that by maintaining a smoother surface, the longevity of the surface may be extended and may also assist in mitigating undesirable side effects when the surface of the coating is marked (e.g. ghosting).

In some embodiments, the compositions further comprise one or more waxes. Examples of suitable waxes include paraffin waxes, polyethylene-based waxes, polypropylene-based waxes, each available from BYK-Gardener GmbH. Without wishing to be bound by any particular theory, waxes may impart at least some "slipperiness" to the surface of the coating when markers are used on the surface, or when additives are present within the compositions to improve abrasion. It is believed that waxes are important since, over time, the film may abrade and/or develop roughness that will prevent dry erasing and/or allow ghosting. It is also, without wishing to be bound by any particular theory, that the incorporation of waxes may allow for some scratch resistance.

Inert powdered fillers, such as clay, talc, powdered calcium carbonate, whiting, zinc oxide, barytes, basic magnesium carbonate, water insoluble soaps, blanc fixe, aluminate, hydrated alkali silico aluminate and litharge can also be included. Normally the amount of filler may vary from a low of 5 parts to a high of 200 parts, for example being about 50 to 100 parts, per hundred parts of reactive hydrogen containing compound or compounds (e. g. polyols). The amount of filler should be adjusted to yield a mixture having the desired resistance to flow. The exact amount is inversely related to density of the filler. Suitable fillers include silicate-containing minerals, such as antigorite, serpentine, hornblends, amphibiles, chrysotile, talc, mica, and kieselguhr; metal oxides such as kaolin, aluminum oxides, titanium oxides, and iron oxides; metal salts such as chalk and heavy spar (barium sulfate); inorganic pigments such as cadmium sulfide and zinc sulfide; and glass, and the like. Fillers may be used either individually or in admixture. The fillers may be added to either or both components of the two component system in quantities totaling about 10 to about 40 percent by weight based on the total quantity of the filled polyurethane adhesive. The skilled artisan will appreciate that the quantity of fillers included within any composition is related to the oil absorption values of the filler and not the density. Indeed, if have high oil absorbing pigments are included, the viscosity of the coating increases and can change the gloss level or smoothness. It is believed that fillers are used to reduce costs or give some other properties like better spacing of the titanium dioxide to improve hiding or weathering.

In addition to the fillers described above, other auxiliary agents and additives may optionally be used in the preparation of the adhesives of the disclosure. Suitable auxiliary agents and additives may include, for example, additional catalysts for the polyisocyanate-polyaddition reaction, drying agents, surface-active additives, anti-foaming agents, dyes, UV stabilizers, plasticizers, wetting agents, dispersing agents, moisture scavengers, drying agents and fungistatic or bacteriostatic substances, such as those described in European Patent Application 81,701 at column 6, line 40, to column 9, line 31. In some embodiments, the compositions may comprise an anti-sag agent, e.g. Cabosil. In some embodiments, the addition of the anti-sag agent, namely Cabosil, may assist in the prevention of the "tiger striping" described herein.

In some embodiments, nanoparticles may be added to the coating compositions. For example, nanoparticle size aluminum oxide may be added so as to provide additional abrasion resistance without, it is believed, not affecting the gloss of the cured composition.

In other embodiments, magnetic materials may be incorporated into the coating compositions. Without wishing to be bound by any particular theory, it is believed that the incorporating of magnetic materials may impart magnetic properties to the coatings, once cured, such that magnets may be adhered to the cured composition, or surface thereof. In other embodiments, the coating composition may be applied to a substrate that already has magnetic properties.

In some embodiments, the amount of additional materials or other materials may range from between about 1% to about 30% by volume of the composition.

Component Ratios

In some embodiments, the first part of the two-part system may be present in an amount ranging from about 30% to about 70% by total volume of the two-part system; and the second part of the two-part system may be present in an amount ranging from about 35% to about 65% by total volume of the two-part system. In some embodiments, the first part and the second part are provided in a ratio of about 1 to about 1.

Without wishing to be bound by any particular theory, it is believed that compositions of the present disclosure may be used as a dry erase coating and/or a top coat for seamless decorated flooring. Compared to the prior art, the present disclosure provides for increased pot life. For example, the prior art coatings may have a pot life of only 10 to 15 minutes, while the compositions of the present disclosure have a 40 to 90-minute pot life. In some embodiments, the coatings of the present disclosure have a pot life of about 45 minutes at a temperature of about 77° F. It is believed that, despite this increased pot life, the present disclosure has the same performance properties of typical polyurethane two-part systems, including those prior art systems comprising acrylates or acrylate-based components.

Application Methods

The compositions of the present disclosure may be used by any commercial painting contractor and lends itself to home and other do-it-yourself applications, who are unlikely to invest in the costly equipment required for two-part epoxy finishes or prohibitively expensive curing systems required for other one dry-erase coating compositions. As with most any painting project, the surface being treated should be free of dirt, oils, debris, and other contaminants. The area should be substantially free of residual dust, particulates, or other construction debris floating in the air as they may adhere to the paint and create unwanted particles that would be detrimental to the suitability of the resultant dry erase writing surface. In some embodiments, a primer may be applied prior to applying the coating compositions of the present disclosure.

The application of the coating composition of the present disclosure to the substrate to be coated takes place with the methods known and customary in coatings technology, such as spraying, knife coating, curtain coating, vacuum coating, rolling, painting, pouring, dipping, spin coating, squeegeeing, brushing or squirting or by means of printing techniques such as screen, gravure, flexographic or offset printing and also by means of transfer methods. The coating composition can be applied using conventional spray equipment or high volume low pressure spray equipment resulting in a high quality finish. Other modes of application are sprinkling, flow coating, dipping, electrostatic spraying, or electrophoresis. In embodiments where the composition is sprayed onto a substrate, Oxsol 100 (available from IsleChem, LLC, Grand Island, N.Y.) or Hi flash naptha at 15% total volume may be used to reach a viscosity of 15 seconds in a Zahn #3 cup (spray gun is a HVLP cup gun with a 1.8 mm nozzle).

In general, the coating can be formed by applying a solution that can have a sufficient viscosity such that the applied coating does not run soon after it is applied or during its curing. At the same time, the solution viscosity should be sufficient to permit easy application. For example, in some embodiments, the applied solution can have a viscosity at 25 degrees C. of between about 75 mPa·s and about 20,000 mPa·s, e.g., between about 200 mPa·s and about 15,000 mPa·s, between about 1,000 mPa·s and about 10,000 mPa·s, or between about 750 mPa·s and about 5,000 mPa·s.

The coating can be painted in a single coat or multiple coats using a roller, spray painted, brush painted or using other types of applicators or application methods such as described above. It is believed that because of the high solids content of the compositions of the present disclosure, the compositions may be applied in one coat with a roller rather than 2 or 3 coats such required when acrylic urethane compositions are used as a top coat. In some embodiments, the compositions may be painted using a foam roller in a single coat. In some embodiments, the coating can have a thickness between about 0.001 inch and about 0.125 inch, e.g., between about 0.002 inch and about 0.1 inch, or between about 0.004 inch and about 0.08 inch, or between about 0.006 inch and about 0.06 inch, or between about 0.008 inch and about 0.04 inch, or between about 0.01 inch and about 0.02 inch. In other embodiments, the coating can have a thickness of greater than 0.005 inch, e.g., greater than 0.0075 inch or greater than 0.010 inch. While not intending to be bound by any theory, it is believed that providing a uniform, adequate coating thickness reduces the likelihood of thin or uncoated substrate portions where marking material might penetrate.

The components of the compositions can be varied to suit the temperature tolerance of the substrate material. For example, the components can be constituted for air drying (e.g. less than 100° F.), low temperature cure (e.g. 100° F. to 180° F.), or high temperature cure (e.g. over 180° F.). The coatings may be formulated to meet the requirements of the equipment intended for use during application.

Unlike conventional dry erase boards and surfaces, should the painted surface contemplated by the present disclosure ever fail to perform due to mistreatment or accidental damage, the surface can be readily re-painted, bringing the surface back to its original level of performance. Indeed, the dry erase paint of the present disclosure may be used to economically repair or restore a conventional dry erase surface that had been damaged or otherwise had its dry erase properties diminished through excessive, and in some instances routine use. This is a much more economical repair than conventional methods, particularly with respect to PVC dry erase wall coverings which typically require the complete removal of the wall covering, repairing and prepping the wall surface to a level five finish, and the re-hanging the PVC dry erase wall covering.

In some embodiments, once the compositions are applied to a substrate they are allowed to cure at ambient temperatures. In some embodiments, the compositions are "tack free" in about one or two hours after application, e.g. such that the paint may be out of dust quicker than competitive products. In some embodiments, the compositions cure to a "dry hard" level in about 10 to about 12 hours, depending upon the thickness of the applied film. In some embodiments the compositions fully cure within about 72 hours, again depending upon the thickness of the applied film.

Substrates

The coating may be applied to or form on many types of substrates, including porous (e.g., paper) and non-porous substrates (e.g., densified ceramics). The substrate could be a flexible film or a rigid movable or immovable structure. Examples of the substrate include, but are not limited to, a polymeric material (such as polyester or polyamide), cellulosic material (such as paper), glass, wood, plaster (painted or unpainted), melamine, fiber board, particle board, chalkboard, gypsum board, densified ceramics, stone (such as granite), concrete, brick, composites, and metal (such as aluminum or stainless steel). The substrate could be a newly built structure or even an old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., a mild acid) in order to provide better adhesion of the coating to the surface or sanded with 150 grit paper.

In other embodiments, suitable substrates to which the coating may be applied include, for example, metal, wood, plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, FUR, PVC, RF, SAN, PBT, PPE, POM, PUR-RIM, SMC, BMC, PP-EPDM, and UP (abbreviations according to DIN 7728T1), paper, leather, textiles, felt, glass, wood, wood materials, cork, inorganically bonded substrates such as wooden boards and fiber cement/concrete/brick slabs, electronic assemblies or mineral substrates. It is also possible to coat substrates consisting of a variety of the above-mentioned materials, or to coat already coated substrates such as floors, countertops, vehicles, aircraft or boats and also parts thereof, especially vehicle bodies or parts for exterior mounting.

Writing on the Cured Surface

Advantageously, when the dry-erase surface is marked with a marking material that includes a colorant and a solvent (e.g. one or more of water, alcohols, alkoxy alcohols, ketones, ketonic alcohols, esters, acetates or mineral spirits), the marking material can be erased from the writable-erasable surface to be substantially invisible and without substantial "ghosting." Ghosting occurs when the marking material allowed to sit on the dry-erase surface and due to porosity of the dry-erase surface, it is able to penetrate the dry-erase surface and becomes difficult to remove even when solvents are used to remove it. This ghosting is well documented in customer complaints and the ghosting is a problem even with dry erase whiteboards that over time, must be replaced due to excessive ghosting. Applicants believed the coating compositions of the present disclosure overcome ghosting issues and allow for marking materials or marking inks to remain on the dry-erase surface for extended periods of time without substantial ghosting.

In some embodiments, the compositions disclosed herein exhibit superior release properties, meaning that a standard dry erase marker, such as the Sanford Expo Bold Dry Erase Marker (Sanford Division of Newell Rubbermaid, Inc., 2707 Butterfield Road, Oak Brook, Ill. 60523) will not penetrate the surface, thereby permitting erasure of the marks with minimal effort and or little or no ghosting. When used with the composition of the present disclosure, those standard markers will not "ghost," i.e. leave residual marks, and the cleaners, such as Sanford Blue Expo white board cleaner (containing 2-Butoxy Ethanol/Acetate, Isopropyl Alcohol), used to maintain dry erase surfaces will not damage the resultant dry erase surface produced by the composition of the present disclosure.

It is also desirable to provide a writing surface that accepts ink from permanent and dry erase markers without dewetting or beading up of ink. Typical marker solvents include ethanol, isopropanol, methyl isobutyl ketone, n-butyl acetate, ethyl acetate, n-propanol, and n-butanol. In order for the marker to completely wet out the dry erase surface without beading up, the surface energy of the dry erase surface must be greater than the surface tension of the solvents in the maker. The solvent in the list above with the highest surface tension is n-butyl acetate, with a surface tension of about 25 mJ/m2. Therefore, in one embodiment, the writing surface of the dry erase article has a surface energy greater than about 25 mJ/m2. In an alternate embodiment, the writing surface of the dry erase article has a surface energy greater than about 30 mJ/m2 as measured by the Dyne Pen Test.

Physical and Chemical Properties

Embodiments and/or aspects may include one or more of the following advantages. The coating surfaces are writable and erasable. The coatings can provide writing surfaces that exhibit little or no image ghosting, even after prolonged normal use or even after any appropriate marker material or marker ink is allowed to remain on the coating surface for an extended period of time. The coatings can be simple to prepare, and can be applied to many different substrates, including both porous (e.g., paper) and non-porous substrates (e.g., densified ceramics). The coatings can be applied to various substrates including, but not limited to, old chalkboards (e.g., blackboards), whiteboards, drywalls, gypsum boards, plaster and painted walls. The coatings can be applied on the substrate on-site to make a writable-erasable product rather than the writable-erasable product being manufactured in a factory. For many substrates, a single coating can provide an adequate writable-erasable surface. The coatings can exhibit good adhesive strength to many substrates. Coating components (prior to mixing) can have an extended shelf-life, e.g., up to about three years. The coatings can be readily resurfaced. The coatings can cure rapidly, e.g., in less than 4 hours, under ambient conditions. The coatings can resist yellowing, as determined by ASTM method G-154, for an extended period of time (e.g., up to 2000 hours). The coatings do not require UV light or high-energy radiation, such as a beam of electrons, for curing. Nevertheless, in some embodiments, light, e.g., UV light, or heat can be utilized to enhance the curing rate. The coatings can have a reduced tendency to run, even when applied upon a vertical substrate. Surface gloss of the coatings can be readily adjusted. The writing surface of the coating can be projectable. The coatings can be hard. The coatings can be substantially impervious to organic solvents and/or inks. The coatings can have a low porosity. Surfaces of the coatings can have a low roughness. The coatings can be impact resistant. The coatings can be made scratch and abrasion resistant. The coatings can be relatively low cost. The coatings can have a high chemical resistance.

In some embodiments, the coating, once cured, has a barcol hardness ranging from about 40 to about 80. In other embodiments, the coating, once cured, has a barcol hardness ranging from about 45 to about 60. In other embodiments, the coating has a barcol hardness of at least 50. In other embodiments, the coating, once cured, has a barcol hardness of about 50. Compared to the prior art, the coatings derived from the present compositions have a greater barcol hardness (e.g. prior art coatings derived from acrylate-based coatings have a barcol hardness of between 20 and 25).

In some embodiments, the write-erasable surface has a gloss of between about 60 and about 80 measured at 60 degrees. In some embodiments, the writable-erasable surface has a gloss of about 95 measured at 60 degrees.

Without wishing to be bound by any particular theory, it is believed that the porosity percentages of coatings can lead to better writable-erasable surfaces. In some embodiments, the coating can have a porosity of between about 1 percent and about 40 percent, e.g., between about 2 percent and about 35 percent, between about 2.5 percent and about 30 percent, between about 3 percent and about 20 percent, or between about 4 percent and about 10 percent. In other embodiments, the coating can have a porosity of less than about 40 percent, e.g., less than about 35 percent, less than about 30 percent, less than about 25 percent, less than about 20 percent, less than about 15 percent, less than about 10 percent, less than about 5 percent, or even less than about 2.5 percent. In some specific embodiments, the coating can have a porosity of about 3 percent, about 33 percent or about 34 percent.

In some embodiments, the cured coating and/or the writable-erasable surface may have one or more of the following attributes. The coating may have a porosity of less than about 40 percent; a thickness of from about 0.001 inch to about 0.125 inch; an elongation at break of between about 5 percent to about 400 percent; a sag resistance of between about 4 and about 8; a VOC content of less than about 250 g/L (such as less than about 100 g/L).

In some embodiments, the coating can have a Taber abrasion value of less than about 150 mg/thousand cycles, e.g., less than about 100 mg/thousand cycles, less than about 75 mg/thousand cycles, less than about 50 mg/thousand cycles, less than about 35 mg/thousand cycles, less than about 25 mg/thousand cycles, less than about 15 mg/thousand cycles, less than about 10 mg/thousand cycles, less than about, less than about 2.5 mg/thousand cycles, less than about 1 mg/thousand cycles, or even less than about 0.5 mg/thousand cycles. Maintaining a low Taber abrasion value can provide long-lasting durability to the coating, reducing the incidence of thin spots, which could allow penetration of marking material through the coating and into the substrate.

In some embodiments, the writable-erasable surface can have an average surface roughness (Ra) of, e.g., between about 0.5 nm and about 7,500 nm, e.g., between about 1 nm and about 6,000 nm, between about 2 nm and about 5,000 nm, between about 5 nm and about 2,500 nm, between about 10 nm and about 1,500 nm, between about 20 nm and about 1,000 nm or between about 25 nm and about 750 nm, such as measured using atomic force microscopy (AFM) in tapping mode using ASME B46.1 (suitable instruments, e.g., WYKO NT8000, are available from Park Scientific). In other embodiments, the coating can have an average surface roughness (Ra) of less than about 7,500 nm, e.g., less than about 5,000 nm, less than about 3,000 nm, less than about 2,000 nm, less than about 1,000 nm, less than about 500 nm, less than about 250 nm, less than about 200 nm, less than about 100 nm, or even less than about 50 nm.

In some specific embodiments, the writable-erasable surface can have an average surface roughness (Ra) of between about 75 nm and about 1,000 nm, e.g., between about 100 nm and about 500 nm or between about 150 nm and about 400 nm. In some specific embodiments, the writable-erasable surface can have an average surface roughness (Ra) of about 150 nm, about 300 nm or about 1,000 nm.

In some embodiments, the writable-erasable surface can have a maximum surface roughness (Rm) of less than about 10,000 nm, e.g., less than about 8,000 nm, less than about 6,500 nm, less than about 5,000 nm, less than about 3,500 nm, less than about 2,000 nm, less than about 1,000 nm, or less even than about 500 nm.

TABLE 1

An example of a two-part system according to the claimed disclosure. Any of parts one and/or two may contain additional components (e.g. pigments, deaerator agents, etc.).

| | | |
|---|---|---|
| Part One | Arnette ALI 140S (resin) | 35.39% by total volume |
| | Arnox 6 (pot-life extender) | 11.8% by total volume |
| Part Two | Tolonate HDB LV (or Tolonate HDB) | 52.81% by total volume |
| Total | | 100% total volume |

TABLE 2

An example of a first part for a two-part system. This first part is used to produce a white paint. This first part comprises about 95% solids by total weight of the first component and about 36% pigment by total weight of the first component. This first part can be mixed with a second part, such as provided in Tables 1 or 4.

| Component | Pounds |
|---|---|
| Arnette ALI 140S | 203.64 |
| Arnox 6 | 67.08 |
| Organophilic clay | 1.27 |
| Silicon dioxide (amorphous) | 4.19 |
| Aluminum oxide | 37.22 |
| Tallicin 4040 | 33.51 |
| Nuosperse 657 | 0.712 |
| TiONA ® 595 Rutile | 146.27 |
| DPM Acetate | 25.32 |
| Incozol-2 | 9.30 |

TABLE 3

An example of a first part for a two-part system. This first part is used to produce a clear paint. This first part comprises about 99% solids by total weight of the first component and about 7% pigment by total weight of the first component. This first part can be mixed with a second part, such as provided in Tables 1 or 4.

| Component | Pounds |
|---|---|
| Arnette ALI 140S | 262.41 |
| Arnox 6 | 87.47 |
| Silicon dioxide (amorphous) | 3.68 |
| Aluminum oxide | 27.49 |
| Tallicin 4040 | 29.45 |
| Incozol-2 | 7.91 |

TABLE 4

An example of a second part for a two-part system. This second part may be mixed with any first part described herein or as provided in Tables 2 or 3. For example, a 50-gallon batch of a first part comprising the components of Table 2 (where the components are provided in the ratios noted in the table) may be mixed with a 50 gallon batch of a second part comprising the components of Table 3 (again, where the components are provide in the ratios noted in the table), to provide 100 gallons.

| Component | Pounds |
| --- | --- |
| Tolonate HDB LV | 430.11 |
| DPM Acetate | 32.51 |

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A kit consisting of:
a first part consisting of an aliphatic polyurethane resin, an aldimine, an organophilic clay, a deaerator agent, a moisture scavenger, an anti-sag agent, a pigment, a wax, and silicon dioxide; and
a second part consisting of a cross-linking agent and a solvent, wherein the solvent is selected from the group consisting of 1-(3-methoxypropoxy)propyl acetate and 1-methoxypropan-2-yl acetate;
wherein the kit is free of acrylates or acrylate-based components.

2. The kit of claim 1, wherein the resin is present in an amount ranging from between about 30% to about 80% by total weight of the first part.

3. A kit comprising of:
a first part consisting essentially of an aliphatic polyurethane a resin, a pot life extender, an organophilic clay, a wax, and a deaerator agent;
a second part consisting essentially of an aliphatic isocyanate cross-linker and a solvent;
wherein the first part and second part are present in a ratio of about 1 to about 1 by total volume;
wherein the kit is free of acrylates or acrylate-based components; and
wherein a cured coating formed from applying a mixture of the first part and the second part to a non-metallic substrate has at least one of a barcol hardness ranging from about 40 to about 80.

4. The kit of claim 3, wherein the cured coating has a porosity of less than about 40%.

5. The kit of claim 3, wherein the cured coating has a sag resistance of between about 4 and about 8.

6. The kit of claim 3, wherein the cured coating has a VOC content of less than about 250 g/L.

7. The kit of claim 3, wherein the cured composition is free of pinholes and tiger striping.

8. The kit of claim 3, wherein after the first and second parts are mixed, the mixture has a pot life of at least 30 minutes.

9. The kit of claim 3, wherein after the first and second parts are mixed, the mixture has a pot life of at least 45 minutes.

10. The kit of claim 3, wherein after the first and second parts are mixed, the mixture has a pot life of at least 60 minutes.

11. A kit comprising:
a first part consisting of a polyurethane resin, an aldimine, a clay, a deaerator agent, a moisture scavenger, an anti-sag agent, a wax, and silicon dioxide; and
a second part consisting of a cross-linking agent and a solvent, wherein the solvent is selected from the group consisting of 1-(3-methoxypropoxy)propyl acetate and 1-methoxypropan-2-yl acetate;
wherein the kit is free of acrylates or acrylate-based components; and
wherein after the first and second parts are mixed, the mixture has a pot life of at least 45 minutes at a temperature of about 77° F.

12. The kit of claim 11, wherein a cured coating formed from applying the mixture of the first part and the second part to a non-metallic substrate has at least one of a barcol hardness ranging from about 40 to about 80, a porosity of less than about 40%, a sag resistance of between about 4 and about 8, or a VOC content of less than about 250 g/L.

13. The kit of claim 11, wherein the first part and second part are present in a ratio of about 1 to about 1 by total volume.

14. The kit of claim 11, wherein the first part is present in an amount ranging from between about 30% to about 70% by total volume of the kit.

15. The kit of claim 11, wherein the kit is free from silanes.

16. The kit of claim 11, wherein the mixture of the first and second parts has a viscosity of between about 75 mPa·s and about 20,000 mPa·s.

\* \* \* \* \*